United States Patent [19]
Benford

[11] Patent Number: 5,319,963
[45] Date of Patent: Jun. 14, 1994

[54] METHOD OF PREDICTING TRANSMISSION OIL TEMPERATURE

[75] Inventor: Howard L. Benford, Bloomfield Hills, Mich.

[73] Assignee: Chrysler Corporation, Highland Park, Mich.

[21] Appl. No.: 65,534

[22] Filed: May 19, 1993

[51] Int. Cl.$^5$ ............................................. G01M 19/00
[52] U.S. Cl. .................................... 73/118.1; 374/141
[58] Field of Search ................ 73/118.1, 116; 374/141

[56] References Cited
U.S. PATENT DOCUMENTS

| | | | |
|---|---|---|---|
| 3,882,740 | 5/1975 | Forster et al. ........................ 74/866 |
| 4,445,599 | 5/1984 | Bopp .................................... 192/3.29 |
| 4,462,492 | 7/1984 | Mueller ................................ 192/3.29 |
| 5,107,246 | 4/1992 | Mogaki ........................... 73/118.1 X |

Primary Examiner—Jerry W. Myracle
Attorney, Agent, or Firm—Mark P. Calcaterra

[57] ABSTRACT

A method for predicting the temperature of automatic transmission fluid, in real time, in an automatic transmission. The method involves determining a constant for thermal inertia of the transmission, determining a torque converter heat flow, determining a transmission heat flow, determining a transmission cooler heat flow and determining an exterior-of-transmission heat flow. From each of the four above-mentioned heat flows and the above-mentioned constant, the transmission fluid temperature is predicted. The predicted temperature is used to modify operational parameters of the transmission such as its shift tables.

9 Claims, 1 Drawing Sheet

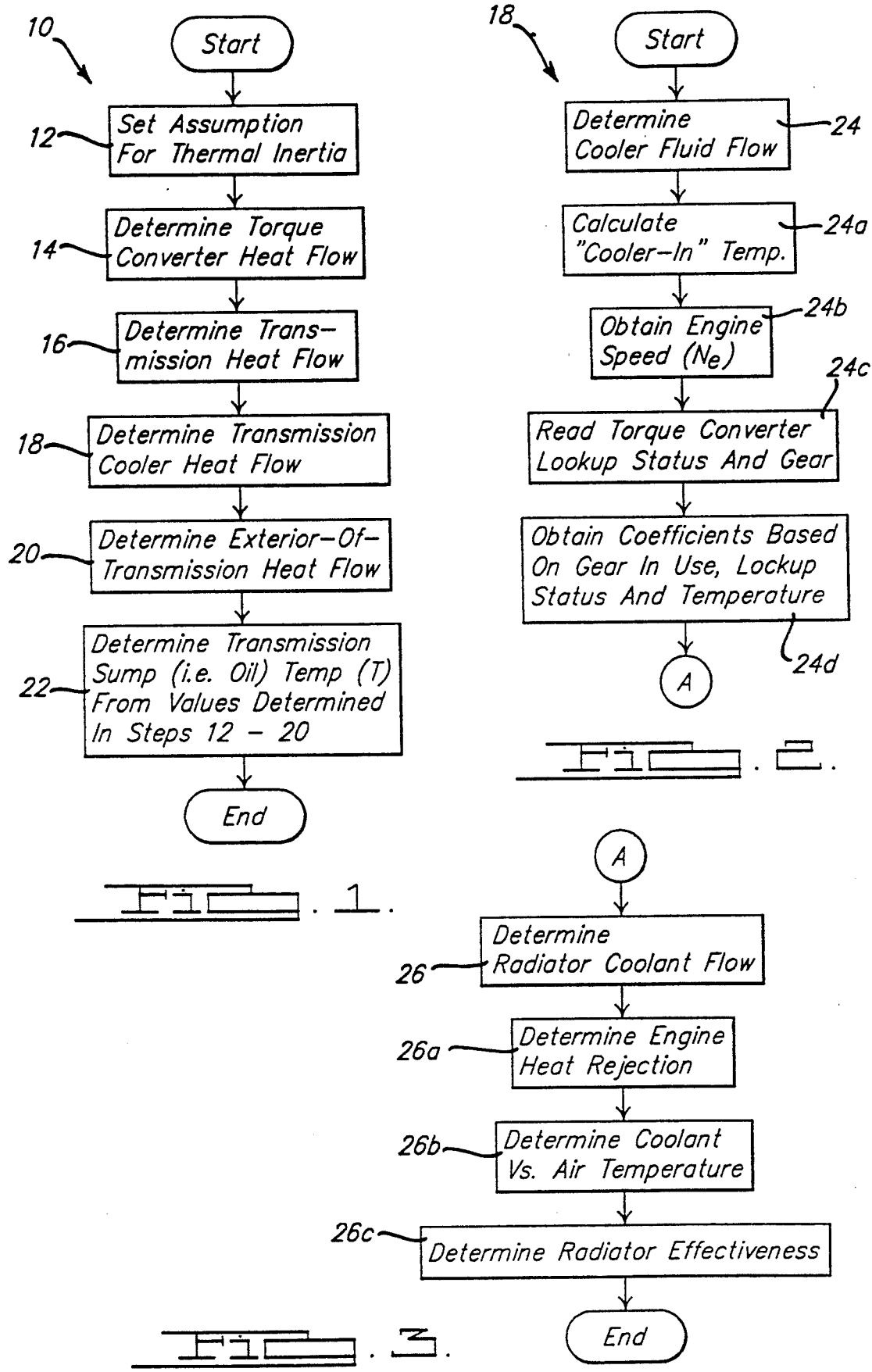

METHOD OF PREDICTING TRANSMISSION OIL TEMPERATURE

BACKGROUND OF THE INVENTION

1. Field of the Invention

The present invention relates to the method of predicting the transmission oil temperature for a motor vehicle, and more particularly, a method for calculating transmission sump temperature based on heat added and subtracted during operation of the transmission.

2. Discussion

Generally speaking, land vehicles require three basic components. These components comprise a power plant (such as an internal combustion engine) a power train and wheels. The internal combustion engine produces force by the conversion of chemical energy in a liquid fuel into mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective traction power demand are matched to each other.

Transmissions are generally referred to as manually actuated or automatic transmissions. Manual transmissions generally include mechanical mechanisms for coupling rotating gears to produce different ratio outputs to drive the wheels. Automatic transmissions are designed to take automatic control of the frictional units, gear ratio selection and gear shifting. A thorough description of general automatic transmission design principles may be found in "Fundamentals of Automatic Transmission and Transaxles," Chrysler Corporation Training Manual Number TM-508A. Additional descriptions of automatic transmissions may be found in U.S. Pat. No. 3,631,741, entitled "Hydromatic Transmission," issued Jan. 4, 1972 to Blomquist et al., U.S. Pat. No. 4,289,048, entitled "Lock-up System for Torque Converter," issued Sep. 15, 1981 to Mikel et al. and U.S. Pat. No. 4,993,527, entitled "Method of Determining and Controlling the Lock-up of a Torque Converter in an Electronic Automatic Transmission System," issued Feb. 19, 1991 to Benford et al. Each of these patents and Training Manual TM-508A are hereby incorporated by reference.

In general, the major components featured in such an automatic transmission are: a torque converter as mentioned above; fluid pressure-operated multi-plate drive or brake clutches and/or brake bands which are connected to the individual elements of the planetary gearsets in order to perform gear shifts without interrupting the tractive-power; one-way clutches in conjunction with the frictional units for optimization of power shifts; and transmission controls such as valves for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuation of the respective frictional units for effecting gear changes in the transmission. The valves used in the hydraulic control circuit typically comprise spring biased spool valves, spring biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations. For example, such hydraulically controlled transmissions are generally limited to one or a very small number of engines and vehicle designs. Therefore, considerable cost is incurred by an automobile manufacturer to design, test, build, inventory and repair several different transmission units in order to provide an acceptable broad model line for consumers.

Additionally, it should be appreciated that such hydraulically controlled transmission systems cannot readily adjust themselves in the field to compensate for varying conditions such as normal wear on the components, temperature swings and changes in engine performance over time. While each transmission is designed to operate most efficiently within certain specific tolerances, typical hydraulic control systems are incapable of taking self-corrective action on their own to maintain operation of the transmission at peak efficiency.

In recent years, however, a more advanced form of transmission control system has been proposed, which would offer the possibility of enabling the transmission to adapt itself to changing conditions. In this regard, U.S. Pat. No. 3,956,947, which issued on May 18, 1976 to Leising, et al., and is hereby incorporated by reference, sets forth a fundamental development in this field. Specifically, this patent discloses an automatic transmission design which features an "adaptive" control system that includes electrically operated solenoid-actuated valves for controlling certain fluid pressures. In accordance with this electric-hydraulic control system, the automatic transmission is "responsive" to an acceleration factor for controlling the output torque of the transmission during a shift from one ratio of rotation (between the input and output shafts of the transmission) to another. Specifically, the operation of the solenoid-actuated valves causes a rotational speed versus time curve of a sensed rotational component of the transmission to substantially follow along a predetermined path during shifting.

Although the idea of locking up the torque converter has been around for many years, few transmissions incorporated this feature before the fuel economy crisis of the 1970's, because the fuel economy benefit of eliminating torque converter slip was not worth the driveability penalty that invariably resulted from eliminating the torque converters dampening effect. Until recently, all torque converter lock-up was of the full lock-up variety, i.e. the lock-up clutch would fully engage and prevent any slip. Engine torsional vibrations would mostly be absorbed in the damper springs located between the lock-up clutch and the turbine hub (transmission input). The lower limit of the engine rpm depended on the damper rate, number of cylinders, etc.; below this limit, high frequency vibrations (torsionals) made lock-up operation objectionable. In some cases, however, lower frequency disturbances, e.g. surge or bucking, raised this limit.

An alternative to this is partial lock-up, a.k.a. controlled slight slippage of the lock-up clutch, which is disclosed in U.S. Pat. No. 4,468,988, issued Sep. 4, 1984 to Hiramatsu. No damper is necessary with this approach; lock-up clutch capacity is modulated to control lock-up clutch slip at some desired value, perhaps 50 rpm. The engine's torsionals go to its own inertia, resulting in an engine speed variation of perhaps ±30 rpm, so that the clutch slips continuously; thus, the input torque to the transmission equals clutch capacity.

As noted, use of electronically controlled solenoid-actuated valves for controlling certain fluid pressure within the transmission is known. However, many factors influence the preferred times during operation in which the solenoid-actuated valves should be activated for controlling fluid pressures. For example, the temperature of the transmission oil during operation of the transmission can have significant effects on the fluid pressures acting on the solenoid actuated valves. By predicting the transmission oil temperatures during operation the solenoid-actuated valves for controlling certain fluid pressures can be more precisely operated.

It is one of the principal objects of the present invention to provide a method for predicting transmission oil temperature wherein such temperature prediction can be used to alter the shift schedule of the transmission.

Another object of the present invention is to provide a method for predicting transmission oil temperature wherein the results can be used to alter the lock-up schedule of the transmission.

It is yet another object of the present invention to provide a method for predicting the transmission oil temperature wherein the results can be utilized to change other flow characteristics which relate to shift quality.

SUMMARY OF THE INVENTION

The above and other objects are accomplished by a method for predicting transmission oil temperature of an automatic transmission, in accordance with a preferred method of the present invention. The method generally comprises determining a constant representative of the thermal inertia of the transmission and the transmission oil (i.e. fluid). Next, the torque converter heat flow is determined, which represents the heat added to the transmission oil by the operation of the torque converter (and lock-up clutch contained therein) of the automatic transmission.

Subsequently, the transmission heat flow is determined, which represents the heat added to the transmission oil in large part from the fluid pump and to gear box parasite drag. Next, the heat flow in the cooler of the transmission is determined, which represents the heat removed by the cooler. Finally, the exterior transmission heat flow is determined, which represents the loss of heat due to cooling of the exterior of the transmission. The thermal inertia constant and above-mentioned heat flows are then used to predict the temperature of the transmission oil at any given time.

BRIEF DESCRIPTION OF THE DRAWINGS

Other objects, features and advantages of the present invention will become more fully apparent from the following detailed description of the preferred method, the appended claims and the accompanying drawings in which:

FIG. 1 is a simplified flow chart illustrating the method of the present invention for predicting the transmission sump temperature based on heat added and subtracted during operation of an automatic transmission vehicle;

FIG. 2 is a flow chart of the steps performed in determining the transmission cooler heat flow; and FIG. 3 is a continuation of the flow chart of FIG. 2.

DETAILED DESCRIPTION OF THE PREFERRED EMBODIMENT

Referring to FIG. 1, there is shown a simplified flow chart illustrating the method of the present invention for estimating the transmission sump temperature (T) based on heat added and subtracted during operation of an automatic transmission of a vehicle. Initially, however, it will be appreciated that heat is typically added from a torque converter of the automatic transmission, as well as the lock-up clutch, from the transmission fluid pump itself and also from transmission gear box parasitic losses. Conversely, heat is removed by the transmission cooler and from the exterior of the transmission.

The method 10 of the present invention contemplates determining the transmission sump temperature (T) by first assuming a single thermal-inertia for the components of the automatic transmission system. A suitable thermal inertia has been found to be about 23 BTU/°F. This thermal-inertia has been found to be representative of approximately 2 gallons of Automatic Transmission Fluid (ATF), 50 pounds of aluminum and 50 pounds of iron/steel. While it is recognized that the assumption of a single thermal-inertia may result in relatively small transient errors in the overall calculation of the transmission sump temperature ($T_0$), it has been found that this assumption does not significantly adversely affect the more "steady-state" results provided by the method 10 and further results in a significant simplification in implementation of the method of the present invention.

Next the torque converter heat flow is determined as indicated at step 14. The torque converter heat flow ($q_{TC}$) is based on known torque converter characteristics in the conversion range, and on engine torque ($T_e$) and on torque converter coupling while in partial or full lock-up.

The next step involves determining the transmission heat flow as indicated in step 16. The transmission heat flow ($q_T$) is essentially due to operation of the transmission fluid pump, whose torque is largely proportional to a line pressure (i.e., which in turn depends on the gear in use) and to gear box parasitic drag, the coefficients for which depend upon the gear being used. It should also be noted that the heat added due to the occurrence of shifts has been omitted in this consideration at the present time in the interest of simplifying the determination of the transmission sump temperature. The presence of shifts is only expected to cause significant errors in the calculation of the transmission sump temperature if there is a great deal of wide open throttle (WOT) shifting, thus generating a significant amount of heat in the clutches of the transmission. It will also be appreciated that suitable compensation values could readily be added to the method 10 described herein to compensate for such a condition if a specific vehicle application is expected to involve significant wide-open-throttle shifting.

Next, the heat flow ($q_c$) in the transmission cooler is determined, as indicated in step 18. The cooler heat flow is the most involved to determine. The basic equation for a heat exchanger is:

$$q = (T_h - T_c) C_L E,$$

where $T_h - T_c$ = heat temperature difference between hot and cold fluids entering the heat exchanger, $C_L$ = the lower of the heat capacity flow rates and $E$ = the effectiveness of the heat exchanger.

Unfortunately, as will be appreciated by those of ordinary skill in the art, automatic transmission fluid (herein after "ATF") flow is strongly influenced by temperature and pressure. With a tank cooler (in the radiator of the vehicle), radiator coolant flow and temperature at the tank cooler undergo rapid changes when the thermostat opens. Heat exchanger effectiveness is a complex function of the two heat capacity flow rates and of the specific tank cooler in use. The precise estimation of transmission cooler heat flow will be explained in greater detail momentarily.

The final heat flow to be determined is the exterior-of-transmission heat flow ($q_x$), as indicated at step 20 in FIG. 1. Essentially, this heat flow is estimated to be the difference between the transmission sump temperature and ambient air temperature, multiplied by a function of vehicle speed which may be determined by vehicle testing with the transmission cooler bypassed. While there are expected to be some operating conditions in which this heat flow estimate may be slightly in error, this error still does not produce a major error in the overall determination of the transmission oil (i.e., sump) temperature ($T_0$).

When each of the heat flows of steps 14–20 have been determined, these heat flow values are used to predict the overall transmission sump temperature (T), as indicated at step 22. This determination can be expressed by the formula:

$$T_0 = T_0(i - 1) + \frac{(q_{TC} + q_T - q_C - q_X)}{3600 M_{TH}} (\Delta t),$$

where $M_{TH}$ = the thermal inertia which has been determined to be equal to approximately 23 BTU/°F., $q_{TC}$ = heat flow of the torque counter, $q_T$ = transmission heat flow, $q_c$ = the transmission cooler heat flow, where $T_0(i-1)$ the previously predicted transmission oil temperature value, $q_x$ = the exterior-of-transmission heat flow and $\Delta t$ = the calculation time interval which is preferably set equal to about 1.8 seconds.

The predicted transmission oil temperature (i.e., sump temperature) can be used advantageously for several functions. First, the predicted transmission oil temperature can be used to alter the shift schedule of the transmission to provide for more uniform and/or smoother shifts by the transmission. The predicted transmission oil temperature can also be used to modify the transmission lock-up schedule. This can prevent lock-up with cold transmission oil and provides extra lock-up with hot oil. Finally, the predicted transmission oil temperature can be used to modify the other flow characteristics of the transmission oil which affect the shift quality such as flow rates to and from friction elements with the transmission.

The torque converter heat flow ($q_{TC}$), as stated above, is based on torque converter characteristics in the torque conversion range or, alternatively, on engine torque and torque converter/LU (i.e., lock-up) slip. In the torque conversion range, the torque converter heat flow ($q_{TC}$) may be expressed as follows:

$$\begin{aligned}
q_{TC} &= .484(N_e T_i - N_t T_t) \\
&= .484 N_e T_i (1 - r_n r_t) \\
&= .484 N_e (N_e/K)^2 (1 - r_n r_t) \\
&= .484 N_e^3 [(1 - r_n r_t)/K^2],
\end{aligned}$$

where $N_e$ = engine speed, $T_i$ = impeller torque, $N_t$ = converter turbine speed, $T_t$ = converter turbine torque, $r_n = N_t/N_e$, $r_t = T_t/T_i$, and K torque capacity factor $N_e/\sqrt{T_i}$. The term in brackets, i.e. $[(1 - r_n r_t)/K^2]$, may also be approximately characterized as $C_1 + C_2(0.9 - r_n)^2$, where $C_1$ and $C_2$ = are based on characteristics.

In the torque converter coupling range or while in partial or full lock-up, the torque converter heat flow is instead expressed as $q_{TC} = .484(N_e - N_t)(T_e - 5)$, where $T_e$ = engine torque. The 0.484 factor in the above equations represents the conversion from lb-ft-rpm to BTU/hr. Under no-slip conditions (where $N_e < N_t + 10$) or no-torque conditions (where $T_e < 5$), the torque converter heat flow ($q_{TC}$) is set to 0.

The transmission heat flow $q_T$ can be represented by the following formula:

$$q_T = C_3 \left[ \frac{N_e}{1000} \right] + 39 \left[ \frac{n_2}{1000} \right]^2 + 39 \left[ \frac{N_e}{1000} \right]^3 +$$

$$C_4 \left[ \frac{N_t}{1000} \right] + C_5 \left[ \frac{N_t}{1000} \right]^2 + C_6 \left[ \frac{N_t}{1000} \right]^3$$

where $C_3$–$C_6$ are based on the gear being used (see Table 3)

Referring now to FIG. 2, the determination of the transmission cooler heat flow ($q_C$) (step 18 at FIG. 1) will be more fully described. Initially, the transmission cooler fluid flow is determined, as indicated at step 24. It will be appreciated that there is very little fluid flow until there is adequate engine speed to fulfill leakage at regulated line pressure. The leakage is a function of oil temperature, line pressure and lock up status. The engine speed needed to fulfill leakage is determined by flow testing. Engine speed in excess of that needed to fulfill leakage has been determined to provide cooler flow at a rate of about 2.0 lb/hr/rpm, and more particularly about 2.09 lb/hr/rpm until maximum cooler flow is attained and the regulator valve starts to vent. Maximum cooler flow is a function cooler-in temperature (i.e., the temperature at the input side of the transmission fluid cooler), torque converter-in pressure (i.e., the pressure at the input side of the torque converter) and torque converter lock-up status (i.e., whether the torque converter is locked-up (LU), partially locked-up (PLU) or unlocked (UL)). These may be represented by the following formulas:

$$m_C = \frac{\text{Cooler Flow}}{2.09(N_E - N_{LK})} ; \begin{array}{l}(\text{lbm} - \text{hr})\\ \text{limit: } 10 \leq m_c \leq m_M\end{array}$$

where $N_{LK}$ = Engine rpm to supply leakage flow at line pressure
= $C_7[T_0(i-1)/100]$; limit $\geq 0$ $C_7$ = function of gear and $LU$ — see Table 3

$m_M$ = Maximum cooler flow
= $6T_{CI}(i-1)$; limit: $10 \leq m_m \leq [C_8 + 1.25T_{CI}(i-1)]$ $C_8$ = function of gear and $LU$ — see Table 3

$T_{CI} \equiv \frac{\text{Cooler Inlet Temperature (°F.)}}{T_0(i-1) \text{ if } LU \text{ or } PLU; \text{ otherwise}}$
= $T_0(i-1) + 0.2q_{TC}/m_C$ Additionally, in some situations the bypass valve pressure setting may also affect maximum cooler flow. For most applications this factor is not anticipated to be significant. The cooler-in temperature may also be expressed as the sump temperature in lock up (LU) or partial lock-up (PLU) but is hotter based on a fraction (by about 10%) of the torque converter heat flow added to it while the torque converter is unlocked. Accordingly, to determine the cooler fluid flow as recited in step 24 in FIG. 2, the torque converter cooler-in temperature is calculated based on the sump temperature lock-up status and torque converter heat flow as indicated as step 24A. Subsequently the engine speed is obtained, as indicated in step 24B. The torque converter lock-up status (i.e., whether the torque converter is locked, unlocked or partially locked) is that as indicated in step 24C to determine which state the torque converter is in and the current gear. Finally, coefficients determined by flow testing and based on gear, lock-up status and temperature are also obtained, as indicated in step 24D. It will be understood, then, that steps 24A-24D of FIG. 2 more fully help to explain the sub-steps involved in step 24.

With further regard to FIG. 3, the next factor that must be determined in determining the overall cooler heat flow is the radiator coolant rate of flow, as indicated generally by step 26. When the engine thermostat is closed this rate of flow is very low. Conversely, when the thermostat is open the rate of flow is proportional to the engine speed, up to a point. When the thermostat is regulating (which may be inferred from the coolant temperature), the flow is estimated. This rate of flow estimate is based on engine heat rejection (which is a function of engine displacement, engine rpm and engine torque), the coolant temperature versus air temperature, and radiator effectiveness (which is a function of vehicle speed). Accordingly, determining the radiator coolant flow, as indicated in step 26, involves determining a value for engine heat rejection, as indicated in step 26A, determining a value representative of the coolant versus air temperature ratio, as indicated in step 26B, and determining a value for radiator effectiveness, as indicated in step 26C. Use of the heat capacities 0.5 BTU/lb—°F. for ATF and 0.8 for coolant gives the two heat capacity flow rates and allows the evaluation of $C_1$. A reasonably simple, yet reasonably accurate expression for E (relative to the classical expression) can be used contains two coefficients which heat exchanger testing provides. This may be expressed as:

$E$ = heat exchanger effectiveness $$\equiv \frac{1 + C_9(1 - c_L/c_H)}{1 + C_L/C_{10}} ; \text{lime } E \leq 1.00$$

Coolant temperature into the heat exchanger is less than the sensed engine coolant temperature (due to its having to be passed through the radiator) by the amount equal to the engine heat rejection divided by the coolant heat capacity flow rate, but not less than air temperature.

The final heat flow determination, that of the exterior-out-transmission heat flow will now be discussed in more detail. Initially, ambient air temperature, if not directly sensed and available on an appropriate communications bus within the vehicle, is estimated based on the heat flow balance on the engine controller of the vehicle, the temperature of which is sensed ("battery temperature"). Heat to the engine controller is due to its temperature difference with the engine. Heat from the engine controller, in turn, is due to its temperature difference with the ambient air multiplied by a function of vehicle speed. Air temperature is calculated from this relationship preferably about every 1.8 minutes and used to update a filtered value approximating the ambient air temperature.

For initializing oil and air temperatures on start up, a routine is provided which incorporates the use of observed temperature decay rates for the engine and the transmission. The ambient air temperature is calculated to be that which will provide this rate for the engine (actually for the engine controller) based on the estimated controller temperature in a time period soon after the engine is turned off and at engine-on (when the engine is initially turned on), but within limits versus the air temperature at engine off based on the amount of off time. The transmission oil temperature is then calculated based upon its estimated engine-off value, calculated air temperature, and programmed decay rate. The time-off (for short times) is obtained by observing engine coolant and ambient air temperature at start up. If the engine is off for more than four hours, however, this transient calculation is abandoned and both temperatures are initialized to the engine-controller temperature at the engine-on time.

The cooler heat flow $q_C$ is represented by the following formula:

$$q_c \equiv \frac{\text{Cooler Heat Flow}}{(T_{CI} - T_R)C_L E}$$

Where $C_L$ = lower heat capacity flow rate, BTU/hr-°F.
= lower of $0.5m_C$ or $0.8m_R$ -continued $M_R$ = Radiator coolant flow, lbm/hr = 10 if $\Sigma < 180$ = $4.0 N_E$, limit $\leq 15,000$ if $\Sigma > 210$; otherwise $$= \frac{q_E}{(\Sigma - T_A)(C_{13} + C_{14}N_0/1000)}, \text{ limit } \leq 15,000$$

$q_E$ = engine heat rejection, BTU/hr

= $(C_{11} + 110 T_E)(N_E/1000)$ $C_{11}$ = function of engine
$T_E$ = engine torque
$T_A$ = air temperature
$C_{13}$ = .05
$C_{14}$ = .05

$T_R$ = radiator coolant temperature at transmission coller

= $\Sigma - C_{12} q_E / m_R$, limit $\geq T_A$ $E$ = heat exchanger effectiveness $$\equiv \frac{1 + C_9(1 - c_L/c_H)}{1 + C_L/C_{10}} \text{ ; lime } E \leq 1.00$$

For $C_1$–$C_{12}$, $C_1$, $C_{10}$, $C_{12}$ = functions of the heat exchanger (see Table 2), and $C_{11}$, $C_{13}$ and $C_{14}$ = exemplary factors are shown in the following tables, where the term "ENG" represents an engine of a particular displacement (in litres), "T/C" represents the stall speed characteristic of various torque invertors of vehicles of the assignee, and $C_9$–$C_{12}$ are presented for different car platforms of the assignee of the present application.

TABLE 1

| Eng | 3.0 | 3.3 | 3.8 | 3.5 | 2.5 Turbo |
|---|---|---|---|---|---|
| T/C | 205K | 180K | 180K | 180K | 260K |
| $C_1$ | 3.0 | 2.5 | 2.5 | 2.5 | 1.8 |
| $C_2$ | 24.5 | 24.8 | 24.8 | 34.8 | 16.3 |
| $C_{11}$ | 21,000 | 23,000 | 26,000 | 24,000 | 17,000 |

TABLE 2

| Body | Car exc. LH | S | LH |
|---|---|---|---|
| Ht X | 1.25 × 8 | 1.5 × 10 | 1.25 × 10 |
| $C_9$ | −.09 | −.06 | −.04 |
| $C_{10}$ | 400 | 618 | 465 |
| $C_{12}$ | 1.25 | 0.65 | 1.25 |

TABLE 3

| | Gear | 1 | 2 | 3 | 4 | P,N | R |
|---|---|---|---|---|---|---|---|
| | $C_3$ | 1700 | 1700 | 1000 | 100 | 1700 | 2800 |
| | $C_4$ | 770 | 920 | 1200 | 1330 | 0 | 770 |
| | $C_5$ | 170 | 120 | 50 | 190 | 0 | 170 |
| | $C_6$ | 15 | 24 | 58 | 155 | 0 | 15 |
| $C_7$ | UL | 300 | 300 | 230 | 230 | 300 | 320 |
| | PLU,LU | — | 370 | 300 | 300 | — | — |
| $C_8$ | UL | 440 | 440 | 440 | 440 | 440 | 440 |
| | PLU,LU | — | 350 | 350 | 350 | — | — |

The invention has been described with reference to a detailed description of a preferred embodiment given for the sake of example only. The scope and spirit of the invention are to be determined by the appended claims.

What is claimed is:

1. A method for estimating, in real time, the temperature of automatic transmission fluid of an automatic transmission having a torque converter, said method comprising the steps of:
   selecting a thermal inertia constant related to transmission fluid volume and to materials used to construct said automatic transmission;
   generating a thermal inertia signal from said thermal inertia constant;
   generating an initial fluid temperature signal related to an estimated initial temperature of said transmission fluid;
   generating a plurality of heat flow signals representing heat gain and heat loss from said automatic transmission;
   estimating said fluid temperature based on said plurality of heat flow signals, said thermal inertia signal, and at least one of said initial fluid temperature signal and a previous estimated fluid temperature signal, and generating an estimated fluid temperature signal;
   generating a normal operating temperature range signal related to a normal operating temperature range of said fluid in said automatic transmission;
   comparing said estimated fluid temperature signal to said normal operating temperature range signal, generating a hot temperature signal if said estimated temperature signal exceeds said normal operating temperature range signal and generating a cold temperature signal if said estimated temperature signal is below said normal operating temperature range signal;
   providing at least one of accelerated automatic transmission lock-up and modification to a shift schedule of said automatic transmission in response to said hot temperature signal to compensate for increased fluid temperature; and
   providing at least one of postponed automatic transmission lock-up and modification to said shift schedule of said automatic transmission in response to said cold temperature signal to compensate for said decreased fluid temperature.

2. The method of estimating the temperature of fluid in an automatic transmission of claim 1 wherein said step of generating said plurality of heat flow signals further comprises the steps of:
   determining a first heat flow value related to heat generated by said torque converter; and
   generating a first heat flow signal from said first heat flow value.

3. The method of estimating the temperature of fluid in an automatic transmission of claim 2 wherein said step of generating said plurality of heat flow signals further comprises the steps of:
   determining a second heat flow value related to heat generated by said automatic transmission; and
   generating a second heat flow signal from said second heat flow value.

4. The method of estimating the temperature of fluid in an automatic transmission of claim 3 wherein said step of generating said plurality of heat flow signals further comprises the steps of:
   determining a third heat flow value related to heat removed from said automatic transmission by a transmission fluid cooler in fluid communication with said automatic transmission fluid; and
   generating a third heat flow signal from said third heat flow value.

5. The method of estimating the temperature of fluid in an automatic transmission of claim 4 wherein said step of generating said plurality of heat flow signals further comprises the steps of:
- determining a fourth heat flow value related to heat removed from an exterior of said engine; and
- generating a fourth heat flow signal from said fourth heat flow value.

6. The method of estimating the temperature of automatic transmission fluid of claim 6 wherein said step of estimating the fluid temperature further comprises the steps of:
- summing said first, second, third and fourth heat flow signals and generating a summed heat flow signal;
- dividing said summed heat flow signal by said thermal inertia signal and generating a quotient signal;
- generating a time signal related to a fluid temperature estimating interval;
- multiplying said quotient signal by said time signal and generating a temperature change signal related to fluid temperature change over said time interval; and
- adding said temperature change signal to a prior estimated fluid temperature signal.

7. The method of estimating the temperature of automatic transmission fluid of claim 4 wherein said third heat flow value is further related to at least one of temperature differences of fluid flow to and from the automatic transmission fluid cooler, engine speed, efficiency of the automatic transmission fluid cooler, and lockup status of the torque converter.

8. The method of estimating the temperature of automatic transmission fluid of claim 3 wherein said second heat flow value is further related to operation of a transmission fluid pump and gear box parasitic drag.

9. The method of estimating the temperature of automatic transmission fluid of claim 2 wherein said first heat flow value is further related to at least one of torque converter characteristics, engine torque and relative coupling of said torque converter.

* * * * *